(12) United States Patent
Trainer et al.

(10) Patent No.: US 6,477,068 B2
(45) Date of Patent: Nov. 5, 2002

(54) APPARATUS AND METHOD FOR CONTROLLING DC POWER TO PRIMARY AND SECONDARY LOAD UTILIZING CAPACITOR

(75) Inventors: David R Trainer, Stafford (GB); Anthony P O'Carrol, Shropshire (GB); Paul A Kendall, West Yorkshire (GB)

(73) Assignee: Lucas Industries Limited, West Midlands (GB)

( * ) Notice: Subject to any disclaimer, the term of this patent is extended or adjusted under 35 U.S.C. 154(b) by 0 days.

(21) Appl. No.: 09/759,772

(22) Filed: Jan. 12, 2001

(65) Prior Publication Data

US 2001/0008350 A1 Jul. 19, 2001

(51) Int. Cl.$^7$ .......................... H02M 3/24; H02H 7/122
(52) U.S. Cl. ..................... 363/74; 363/56.03; 363/56.04
(58) Field of Search ............................ 363/56.02, 56.03, 363/56.04, 56.05, 95, 98, 73, 74, 132

(56) References Cited

U.S. PATENT DOCUMENTS

| | | | | |
|---|---|---|---|---|
| 4,151,387 A | * | 4/1979 | Peters, Jr. ................... 219/626 |
| 4,319,177 A | * | 3/1982 | Kawada et al. ............. 318/798 |
| 4,716,515 A | * | 12/1987 | Alexander .................. 363/138 |
| 5,283,726 A | * | 2/1994 | Wilkerson .................... 363/41 |
| 5,291,106 A | * | 3/1994 | Mutry et al. ................. 318/375 |
| 5,942,876 A | * | 8/1999 | Mackawa ................... 318/801 |
| 5,945,802 A | * | 8/1999 | Konrad et al. .............. 318/807 |
| 6,031,738 A | * | 2/2000 | Lipo et al. ..................... 363/37 |

* cited by examiner

*Primary Examiner*—Bao Q. Vu
(74) *Attorney, Agent, or Firm*—Andrus, Sceales, Starke & Sawall, LLP

(57) ABSTRACT

An apparatus for supplying and controlling electrical power having a power source for supplying electrical power to a primary load and a secondary load, a capacitor connected to an input to the secondary load and control means operable to cause an operating condition of the apparatus to temporarily change from, a operating condition in which power from the power source is supplied to the primary and secondary loads to an alternative operating condition in which power from the power source is supplied to the primary load but is supplied to the secondary load thereby increasing the minimum voltage the capacitor can maintain at the input to the secondary load.

19 Claims, 6 Drawing Sheets

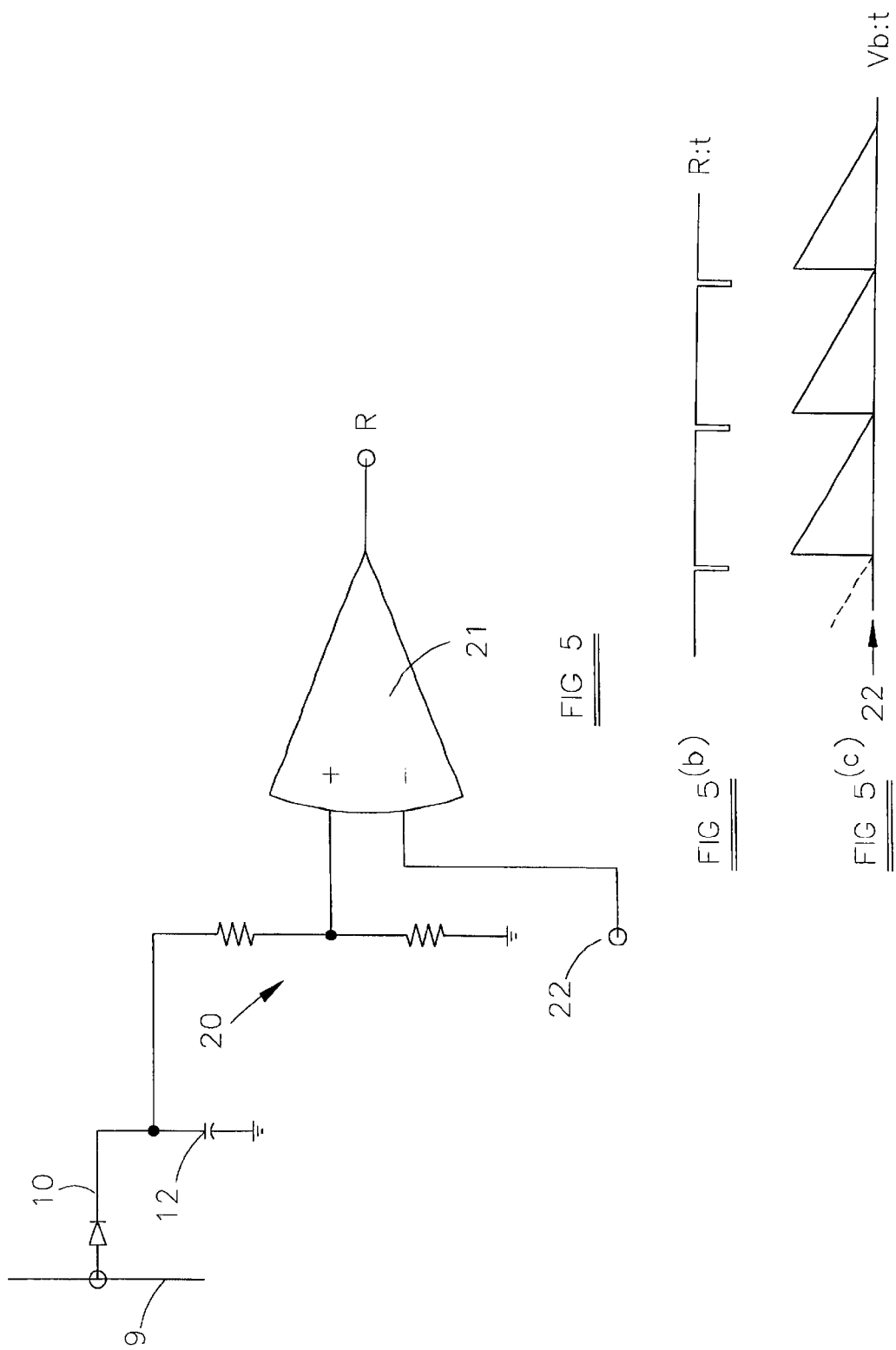

APPARATUS AND METHOD FOR CONTROLLING DC POWER TO PRIMARY AND SECONDARY LOAD UTILIZING CAPACITOR

FIELD OF THE INVENTION

The invention relates to an apparatus and method for supplying and controlling electrical power to a primary load and to a secondary load.

BACKGROUND OF THE INVENTION

Power sources used for supplying electrical power to a primary load generally have significant internal impedance, so that as the load increases the internal impedance has an increasingly significant effect on the output voltage of the source. Therefore, the voltage seen by a load driven by a voltage source will droop as he load draws more current because of the increase in voltage dropped across the source impedance. Where a much smaller secondary load is also driven by the power source, the voltage droop may have a disproportionate effect on the voltage range experienced at the input to the secondary load. If the same source supplies a plurality of primary loads which may draw power at independently varying times, the change in the range of voltage suppliable to the secondary load may be greater still.

A particular problem has been experienced in the provision of a regulated power supply to provide stable current and voltage to the secondary load, as is desirable, for example, where the secondary load includes electronic circuitry. This is because regulation of such a power supply becomes more complex and expensive the wider the range of input voltage it has to cope with.

SUMMARY OF THE INVENTION

The invention provides an apparatus for supplying and controlling electrical power, comprising:
  a power source for supplying electrical power to a primary load and a secondary load;
  a capacitor connected to an input to the secondary load; and
  control means operable to cause an operating condition of the apparatus to temporarily change from;
  a primary operating condition in which power from the power source is supplied to the primary and secondary loads to;
  an alternative operating condition in which power from the power source is not supplied to the primary load but is supplied to the secondary load;
  thereby increasing the minimum voltage the capacitor can maintain at the input to the secondary load.

The invention is particularly beneficial when used in association with a high power primary load, for example an electric motor driving a mechanical actuator, and a relatively low power secondary load, for example electronic control circuitry. The arrangement is particularly advantageous if the apparatus is in the alternative operating condition for relatively short time periods separated by relatively large time intervals because the effect of such short interruptions in power to the primary load should have little or negligible effect in practice on the performance of the primary load.

The invention is advantageous in that the voltage seen by the secondary load when the primary load no longer draws current from the power source may approach or, in some embodiments, exceed open circuit voltage.

Preferably, the capacitor is connected to the input of a power supply device for supplying electronic circuitry.

The range of voltage seen by the input to the power supply device can thus be reduced, thereby simplifying regulation of the power supply device. This facilitates the provision of a stable power supply, for example for supplying electronic circuitry, without the necessity for complex regulation arrangements which inevitably involve consequential increased manufacturing costs and/or increased weight and/or reduced reliability.

The apparatus may be operable to change between the primary and the alternative operating conditions in response to an instant operating parameter, for example a voltage at the input to the, secondary load. This facilitates more accurate control of the voltage seen by the input to the secondary load, and is also more energy efficient because the power supplied to the primary load is only interrupted when necessary.

Conveniently, the apparatus comprises a comparator operable to repeatedly compare an operating value representing the voltage at the input to the secondary load with a predetermined reference value and to communicate to the control means the result of the comparisons for enabling the control means to temporarily change from the primary operating condition to the alternative operating condition when the voltage at the input to the secondary load falls below a minimum desire level. In this manner the apparatus can be arranged to control the voltage at the input to the secondary load to be above a minimum desired level.

Alternatively, the control means may be operable to temporarily change the operating condition of the apparatus from the primary to the alternative operating condition for predetermined time periods and/or at predetermined time intervals. This facilitates reduction of the complexity and/or weight and/or manufacturing cost of the apparatus.

Preferably, the control means, in the alternative operating condition of the apparatus, is operable to disconnect the primary load from the power source and provide a short circuit across the primary load. This facilitates the provision of relatively simple control circuitry.

Alternatively, the control means is operable to reverse the flow of current from the power source to the load in the alternative operating condition of the apparatus. This enables power from the primary load to be used to regenerate the power source during the selected time periods. For example, where the primary load comprises an ac motor, collapse of flux in the motor windings when power from the source to the motor is switched off can be used to create a reverse current through the source at a higher voltage than the open circuit voltage of the source.

Preferably, a device is provided for preventing current flowing from the secondary load input to the power source. This device is conveniently a diode. This enables the voltage at the input to the secondary load to be greater than the output voltage of the power source under certain operating conditions.

The power source is preferably a d.c. power source, and may comprise a fuel cell or a battery of fuel cells.

The control means preferably includes a d.c. to a.c. converter for supplying a primary load comprising an a.c. motor. The converter conveniently comprises switch means operable to switch the apparatus from the primary operating condition to the alternative operating condition. The switch means may comprise an electronic circuit including semi-conductor switches.

The control means preferably includes a programmable electronic control device.

The power supply device is preferably a regulated d.c. power supply for supplying electronic control circuitry.

The time constant of the capacitor may be of the order of tens of microseconds.

The invention also includes a method of supplying and controlling electrical power from a power source to a primary load and to a secondary load which has a capacitor connected to an input thereof, comprising temporarily interrupting the supply of power from the power source to the primary load, thereby increasing the minimum voltage the capacitor can maintain at the input to the secondary load.

The time periods of the interruptions and/or intervals between the interruptions may be selected in response to an instant operating parameter, for example a voltage measured at the input to the secondary load.

Alternatively, the time periods of the interruptions and/or intervals between the interruptions may be predetermined.

Preferably, the time periods are short compared to the time intervals. The time periods are conveniently in the range 10 to 20 microseconds. On the other hand, the time intervals are conveniently of the order of 2 milliseconds.

The supply of power from the power source to the primary load may be interrupted and the load short circuited. Alternatively the supply of power from the power source to the primary load may be interrupted and the current to the primary load reversed.

Using the latter method, the interruption of power to the primary load is conveniently used to cause a collapse in flux in the windings of an a.c. motor, the resulting motor generated voltage being applied to the power source and seen by the input to the secondary load. Such a motor generated voltage may be higher than the open circuit voltage of the power source. This facilitates recharging of the capacitor at a higher rate, and/or regeneration of the power source.

BRIEF DESCRIPTION OF THE DRAWINGS

In order that the invention may be better understood, two embodiments thereof will now be described, by way of example only, with reference to the accompanying drawings, in which:

FIG. 5 is a schematic diagram of a portion of the system showing an arrangement including a comparator for providing alternative, closed loop, control of the refresh actions in response to the instantaneous operating voltage at the capacitor.

DETAILED DESCRIPTION OF THE INVENTION

Figure 1:
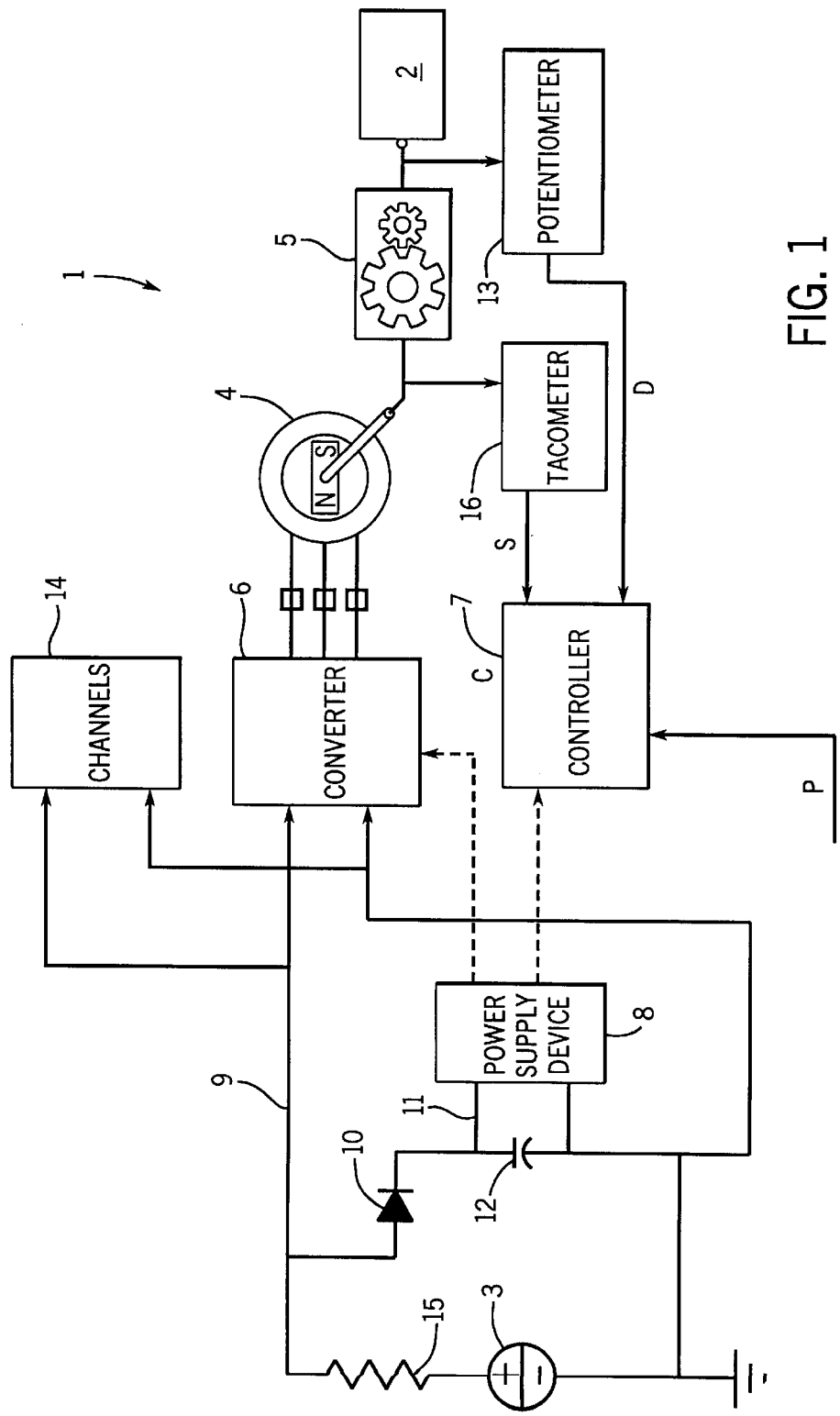
FIG. 1 is a schematic diagram showing the interrelationship of main elements of a control system for driving and controlling a mechanical actuator.

Referring first to FIG. 1, a system 1 is shown for controlling the movement and position of an output shaft 2 connected to an input member of an actuator (not shown). The system 1 includes a d.c. power source 3 for driving a primary load in the form of a three-phase motor 4 which drives the output shaft 2 via a gearbox 5. The power source also supplies a secondary load in the form of control means of the system 1, including a converter 6, for converting the d.c. power to a.c. for driving the motor 4, and a controller 7 for controlling the converter 6. The converter 6 and the controller 7 are electronic devices driven by a regulated power supply device 8. Power is supplied along a d.c. bus 9 to the converter 6 for driving the motor 4. Power for the power supply device 8 is taken from the d.c. bus 9 through a diode 10 to an input 11 of the power supply device 8. A capacitor 12 is connected across the terminals of the power supply device 8 to assist in temporarily maintaining the voltage at the power supply device input 11 should the voltage along the d.c. bus 9 drop.

Current flow from the capacitor 12 to the d.c. bus is prevented by diode 10, enabling the voltage at the input 11 to be higher than the bus voltage under certain operating conditions.

The desired position P of the actuator is input to the controller 7 which controls the converter 6 to drive the motor 4. In the exemplary system 1, closed loop feedback signals S, D are provided to the controller 7 respectively by a tachometer 16 connected to the motor output and by a potentiometer 13 connected to a gearbox output shaft. Current feedback C is also provided from the converter 6 to the controller 7.

The system may include other channels 14 supplied by the d.c. bus 9 instead of or in addition to the converter 6, motor 4, gearbox 5, output shaft 2, and actuator channel described above. Such channels represent the primary load of the power source 3. The system 1 may also supply other secondary load channels such as other power supply devices, in addition to the power supply device 8. The d.c. power source 3 may be a fuel cell, or a battery of fuel cells. Other, alternative, suitable power sources could also be used as will readily be apparent to the skilled person.

In use, when a demand P is made to alter the position of the actuator and/or to load at least one of the primary loads, the voltage $V_c$ provided along the d.c. bus 9 by the power source 3 will droop as shown in FIG. 2c. Clearly, the droop will be more severe the more channels that are simultaneously activated. As the voltage $V_c$ of the d.c. bus 9 drops, the capacitor 12 is gradually discharged in satisfying the power supply requirements of device 8. However, this discharge of the capacitor produces a consequential capacitor voltage $V_b$ drop at the input 11 to the power supply device 8 as shown in FIG. 2b. The further the capacitor voltage $V_b$ is allowed to drop, the greater the input voltage range with which the power supply device 8 has to cope. However, in the exemplary system, a refresh action R is initiated for a predetermined time period at regular time intervals as shown in FIG. 2a and results in an increase in the d.c. bus voltage $V_c$ back to the open circuit voltage of the d.c. power source 3 for the short time periods involved. As best seen in FIG. 2b, the capacitor 12 is refreshed during each time period to its original voltage. Since the capacitor 12 is continually refreshed, it can be used to maintain a desired minimum voltage at the input to the power supply device 8.

It should be apparent that the refresh action reduces the range of voltage with which the power supply device 8 has to cope.

The exemplary system 1 has four actuator channels, a power source open circuit voltage of 150 volts nominal, 170 volts maximum, a power source internal resistance of 0.25 ohms nominal, and a maximum current per channel of 94.5 amps (including tolerances due to measuring circuits). The refresh time periods have predetermined lengths of approximately 16 microseconds and the intervals between the refresh time periods have predetermined lengths of about 2 milliseconds. As shown in FIG. 2b, the capacitor voltage $V_b$ is maintained at or above a minimum value of 100 volts, thereby reducing the input voltage range to about 50 volts. These results are with the designed maximum input voltage range for the exemplary power supply device which is 80 volts to 270 volts (an operating ratio of 3.375:1). In contrast the minimum d.c. bus voltage is 55.5 volts (150 volts minus (4×94.5 amps×0.25 ohms)) and the maximum d.c. bus voltage is 264.5 volts (170 volts plus (4×94.5 amps×0.25 ohms)). This represents a 5:1 variation in d.c. bus voltage. The reduction in the power supply device input voltage variation is very significant in terms of reducing the complexity of design necessary to provide effective regulation of the power supply device 8.

The refresh action is obtained by placing the system in an alternative operating condition in which no power is drawn by the motor 4 or other primary loads. The system is placed in this condition for the 16 microsecond time period already described, which is very short compared to the time interval of 2 milliseconds between refresh actions. Because no current is being drawn by the primary load or loads in the alternative operating condition, there is negligible voltage drop caused by current passing through the internal resistance (source impedance) 15 of the power source 3, resulting in a rise in d.c. bus voltage $V_c$ to approximately open circuit voltage as best seen in FIG. 2c. Of course, the time needed to refresh the power supply device capacitor 12 depends on the value of the capacitor 12 and the resistance in the charging path (dominated by the power source resistance). The capacitor 12 is typically chosen to be in the range 10 to 20 microFarads, and in the exemplary system is 10 microFarads. With the exemplary typical source resistance of 0.25 ohms, the refresh action can be completed in a time period of about 10 to 20 microseconds.

The relatively very short time periods for which the system is in the alternative operating condition result in a 0.8% drop in the power supplied to the motor 4 and/or other channels 14, which has negligible effect on the performance of the actuator or other driven device.

Figure 3:
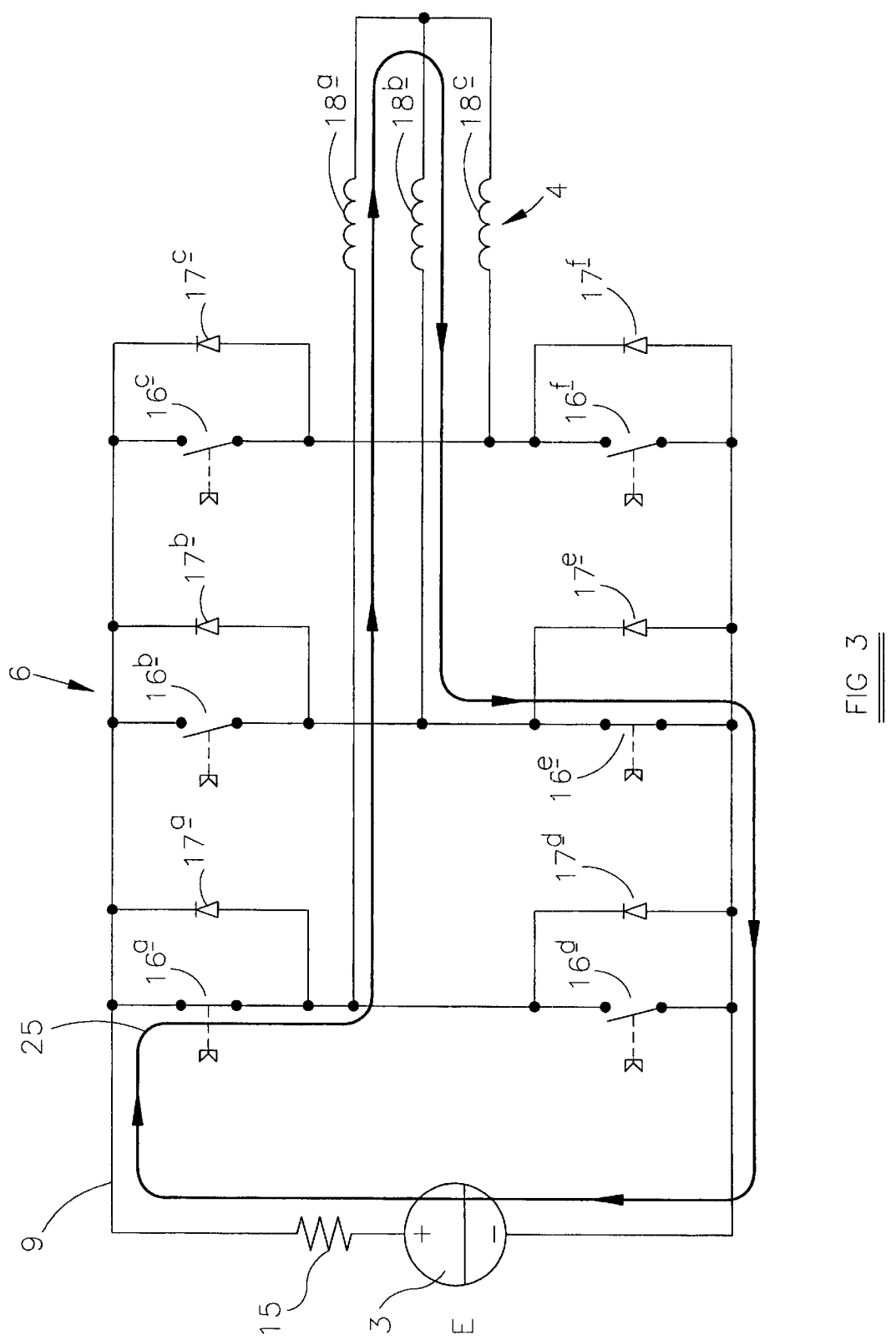
FIG. 3 is a schematic diagram showing the instantaneous current flow through switch means of a converter of the system in motor-driving mode.
Figure 4A:
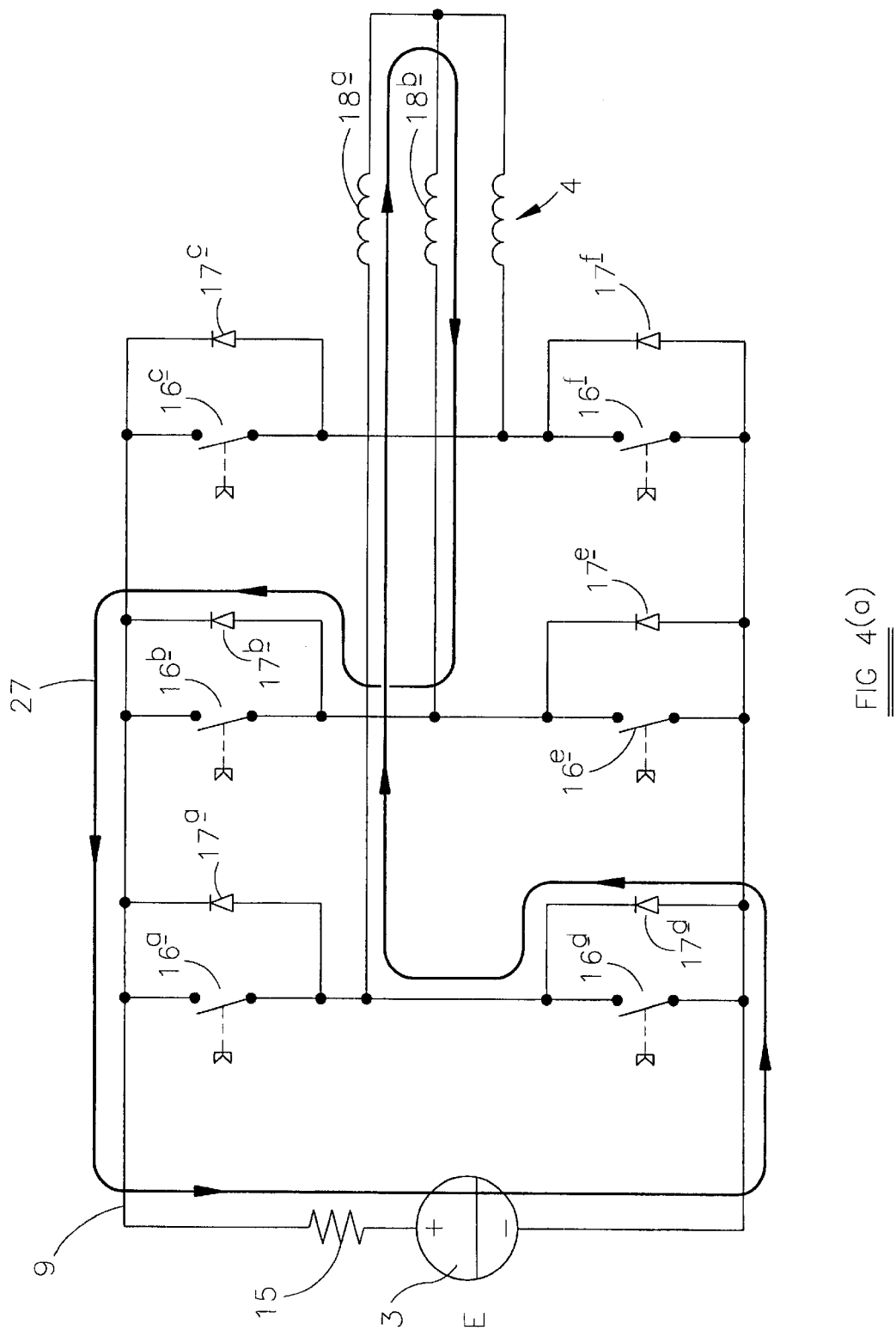
FIG. 4(a) is a schematic diagram showing the current flow through the converter during a refresh action in accordance with a second embodiment.
Figure 4B:
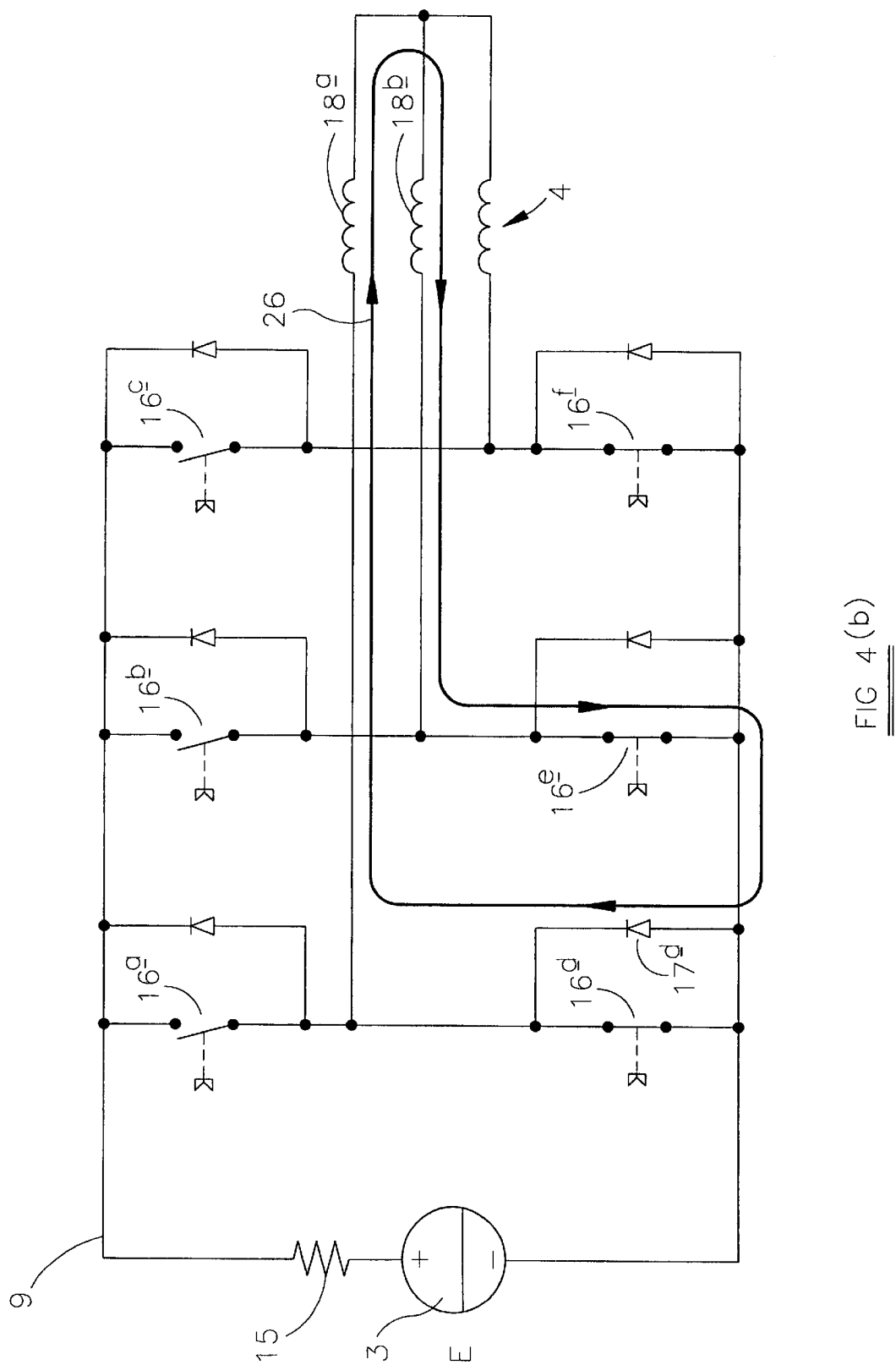
FIG. 4(b) is a schematic diagram showing the current flow through the converter during a refresh action in accordance with the first embodiment.

Referring now to FIGS. 3, 4(a) and 4(b), the converter 6 comprises six semi-conductor switches 16a to 16f and six diodes 17a to 17f, each semiconductor switch 16a to 16f being connected in parallel with a respective one of the diodes 17a to 17f. Two of each of the pairs 16a, 17a to 16f, 17f are connected in series and the three sets of twinned pairs are connected in parallel across the power source. One end of each winding 18a, 18b and 18c of the three phase motor 4 is connected between respective ones of the twinned pain, and the other end of each winding is connected together so that the motor is connected in star configuration. However motors connected in a delta configuration may also be used. The motor is controlled by the controller 7 so as to cause the semi-conductor switches in the power electronic converter 6 to open and close sequentially. In this way pairs of motor windings are energised in a predetermined sequence. Such motor driving techniques are well known in the art and therefore not further discussed here. FIG. 3 shows the motor being driven at one particular instant in time at which the controller 7 has caused semiconductor switches 16a and 16e to close so that current flows through motor windings 18a and 18b. The current flow path 25 is marked as a heavy line, with arrows marking the direction of current flow. In this mode, the d.c. bus voltage falls below the open-circuit voltage of the power source 3.

Figure 2:
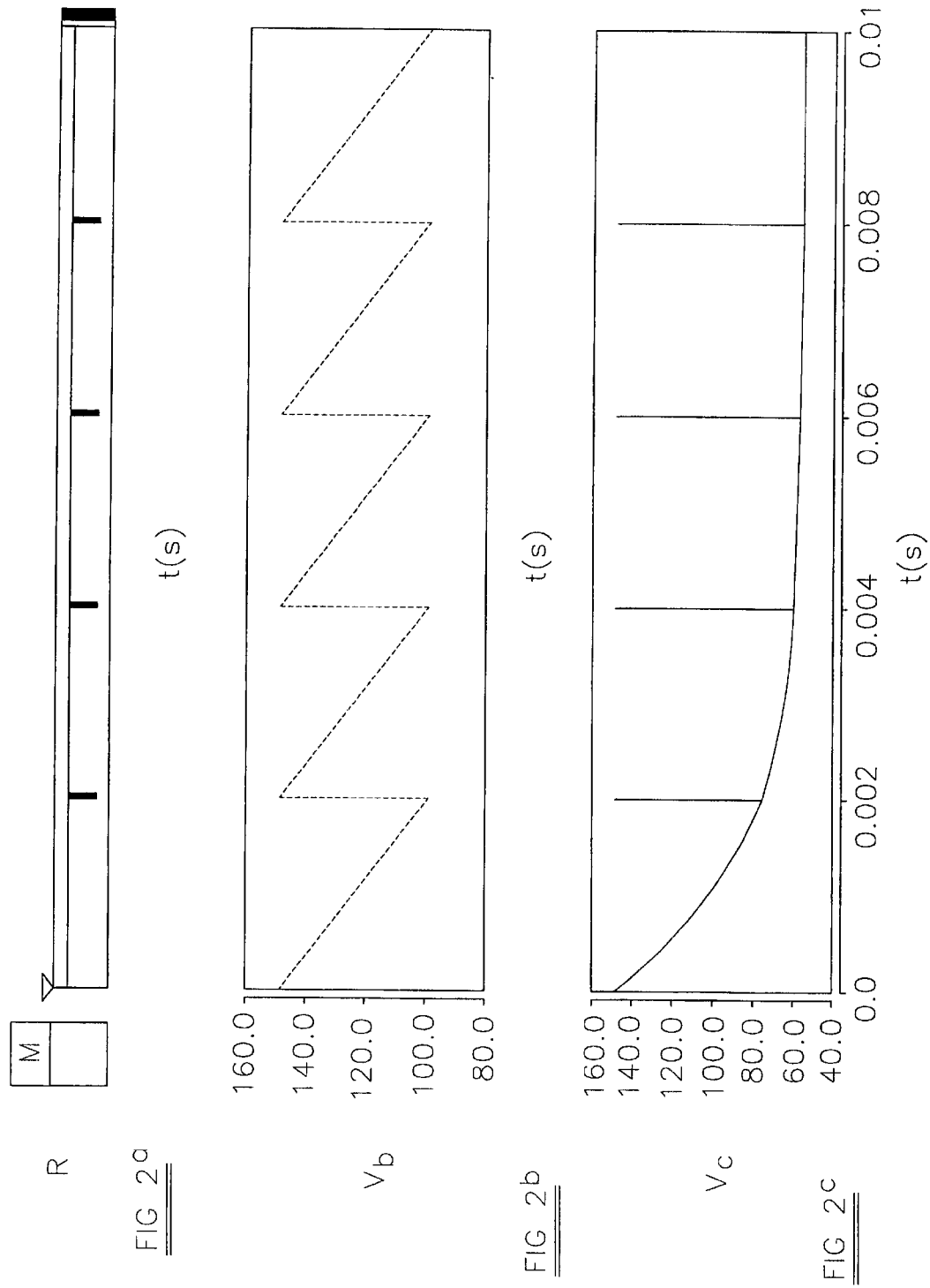
FIG. 2 shows the variation in the voltage of a d.c. bus of the system (FIG. 2c) and of a capacitor of the system (FIG. 2b) with time in response to a predetermined sequence of refresh actions (FIG. 2a) in accordance with a first embodiment of the invention.

Referring to FIG. 4(b), in the first embodiment, described with respect to FIG. 2, each of the semiconductor switches 16d, 16e, 16f of the lower set of twinned pairs is closed, while each semiconductor switch 16a, 16b, 16c of the upper set of twinned pairs is opened. This prevents supply of power from the source 3 to the motor 4 so that the d.c. bus voltage substantially equals the open-circuit voltage of the power source 3, thereby providing the necessary refresh action. The closed switch 16e and the diode 17d cause a short circuit across the motor, so that the motor current 26 continues to flow through switch 16e, diode 17d and through the windings 18a, 18b as shown by the arrows in FIG. 4(b).

In a second embodiment shown in FIG. 4(a) the controller 7 is arranged to open all of the semiconductor switches 16a to 16f. This causes the necessary refresh action by preventing current flow from the d.c. source 3. However, with the collapse in flux in the motor windings 18a and 18b, a reverse current 27 flows through diodes 17b and 17d to the power source as shown by the arrows in FIG. 4(a), increasing the d.c. bus voltage above the voltage of power source 3, and thus recharging the capacitor 12 to a greater voltage than the maximum open circuit source voltage.

Instead of the time periods and time intervals being implemented by the controller at a set time and at a constant frequency, as described above in connection with FIG. 2, the refresh action may be initiated in response to the instantaneous voltage sensed at the power supply device input 11. FIG. 5 shows an exemplary arrangement for such a closed loop refresh action. A voltage value which is proportional to the power supply device input voltage is sensed using a voltage divider 20. The resultant signal is sent to a comparator 21 with hysteresis. If the sensed voltage falls below a predetermined reference voltage 22, the comparator emits a refresh signal R to the controller 7 to initiate a refresh action (FIG. 5b). In this manner, the power supply device input voltage $V_b$ is maintained above a predetermined minimum voltage (FIG. 5c). The alternative refresh arrangement can result in an even smaller effect on overall system performance, since drive to the motor or other primary load is only interrupted if the d.c. bus voltage drops significantly, which may be an infrequent event if the system is used in a device where it is rare for all the primary loads to demand maximum power at the same time. The additional power losses caused by switching the semiconductor switches on and off to carry out the refresh action have negligible effect on system performance.

It will be appreciated that the invention can be used with primary loads other than the three-phase a.c. motor described and shown in the drawings, and that the skilled person will be aware of other methods of temporarily preventing the primary load from drawing power from the power source. The controller 7 may be a programmable device such as a microprocessor.

What we claim is:

1. An apparatus for supplying and controlling electrical power, comprising:

a power source for supplying DC electrical power to a primary load and a secondary load;

a capacitor connected to a power input of the secondary load;

a device connected between the power source and the capacitor for preventing current flowing from the power input of the secondary load to the power source; and control means operable to cause an operating condition of the apparatus to temporarily change from a primary operating condition in which power from the power source is supplied to the primary and secondary loads to an alternative operating condition in which power from the power source is not supplied to the primary load but is supplied to the secondary load, thereby increasing the minimum voltage the capacitor can maintain at the power input to the secondary load.

2. An apparatus as claimed in claim 1, wherein the capacitor is connected to the input of a power supply device for supplying electronic circuitry.

3. An apparatus as claimed in claim 1, operable to change between the primary and the alternative operating conditions in response to an instant operating parameter.

4. An apparatus as claimed in claim 3, wherein the operating parameter is a voltage at the input to the secondary load.

5. An apparatus as claimed in claim 1, operable to repeatedly compare an operating value representing the voltage at the input to the secondary load with a predetermined reference value and to communicate to the control means the result of the comparisons for enabling the control means to temporarily change from the primary operating condition to the alternative operating condition when the voltage at the input to the secondary load falls below a minimum desired level.

6. An apparatus as claimed in claim 1, wherein the control means is operable to temporarily change the operating condition of the apparatus from the primary to the alternative operating condition for predetermined time periods and/or at predetermined time intervals.

7. An apparatus as claimed in claim 1, wherein the control means, in the alternative operating condition of the apparatus, is operable to disconnect the primary load from the power source and provide a short circuit across the primary load.

8. An apparatus as claimed in claim 1, wherein the control means is operable to reverse the flow of current from the power source to the primary load in the alternative operating condition of the apparatus.

9. An apparatus as claimed in claim 1, wherein the device is a diode.

10. An apparatus as claimed in claim 1, wherein the control means includes a d.c. to a.c. converter for supplying a primary load comprising an a.c. motor.

11. An apparatus as claimed in claim 10, wherein the converter comprises switch means operable to switch the apparatus from the primary operating condition to the alternative operating condition.

12. An apparatus as claimed in claim 2, wherein the power supply is a regulated d.c. power supply for supplying electronic control circuitry.

13. A method of supplying and controlling electrical power from a DC power source to a primary load and to a secondary load which has a capacitor connected to a power input thereof and a device connected between the power source and the capacitor for preventing current flowing from the power input of the second load to the power source, the method comprising the step of temporarily interrupting the supply of power from the power source to the primary load, thereby increasing the minimum voltage the capacitor can maintain at the power input to the secondary load.

14. A method as claimed in claim 13, wherein time periods of the interruptions and/or intervals between the interruptions are selected in response to an instant operating parameter.

15. A method as claimed in claim 14, wherein the operating parameter is a voltage measured at the input to the secondary load.

16. A method as claimed in claim 13, wherein time periods of the interruptions and/or intervals between the interruptions are predetermined.

17. A method as claimed in claim 16, wherein the time periods are short compared to the time intervals.

18. A method as claimed in claim 13, wherein the supply of power from the power source to the primary load is interrupted and the load is short circuited.

19. A method as claimed in claim 13, wherein the supply of power from the power source to the primary load is interrupted and the current to the primary load is reversed.

* * * * *

UNITED STATES PATENT AND TRADEMARK OFFICE
CERTIFICATE OF CORRECTION

PATENT NO. : 6,477,068 B2
DATED : November 5, 2002
INVENTOR(S) : David R. Trainer et al.

It is certified that error appears in the above-identified patent and that said Letters Patent is hereby corrected as shown below:

<u>Title page,</u>
Item [65], Prior Publication Data, delete "US 2001/0008350 A1 Jul. 19, 2001" and substitute therefore -- 0000864.9 January 15, 2000. --

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,477,068 B2
DATED         : November 5, 2002
INVENTOR(S)   : David R. Trainer et al.

It is certified that error appears in the above-identified patent and that said Letters Patent is hereby corrected as shown below:

<u>Title page</u>,
Item [65], Prior Publication Data, delete "0000864.9 January 15, 2000" and substitute therefore -- US 2001/008350 A1 Jul. 19, 2001. --

Add -- [30] Foreign Application Priority Data
      January 15, 2000 (GB) ......................0000864.9 --

Signed and Sealed this

Fifth Day of October, 2004

JON W. DUDAS
*Director of the United States Patent and Trademark Office*